Dec. 30, 1958  G. M. FLYNN  2,866,430
CAN BODY SIDE SEAM WIPING MEANS
Filed Nov. 25, 1955  3 Sheets-Sheet 1
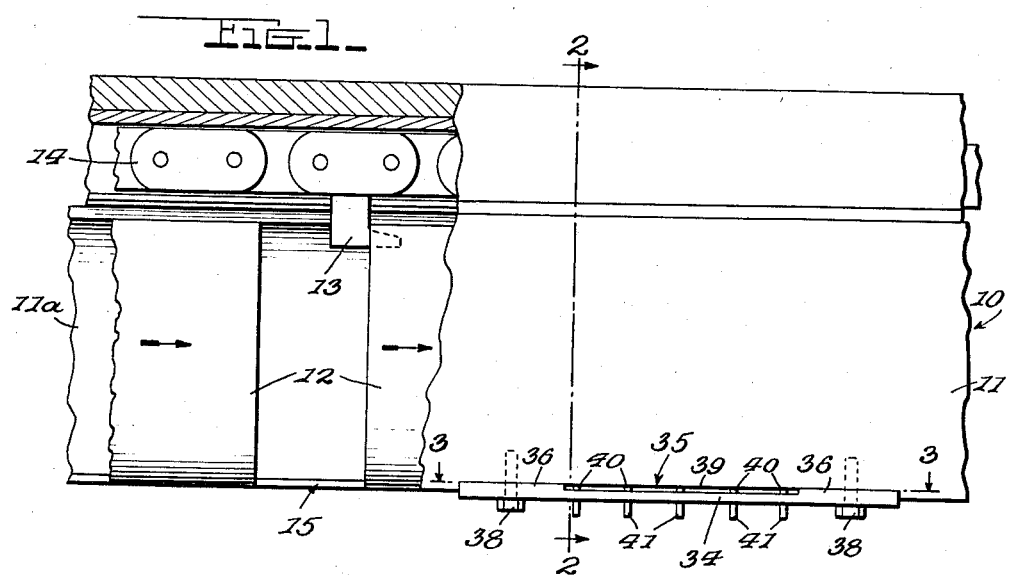
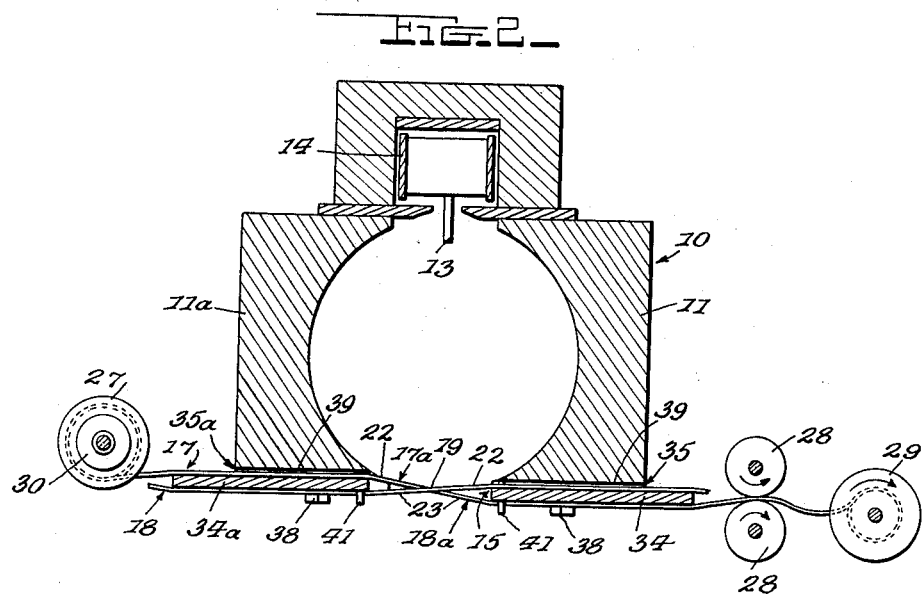
INVENTOR
G. M. Flynn
BY Mason, Porter, Diller & Stewart
ATTORNEYS

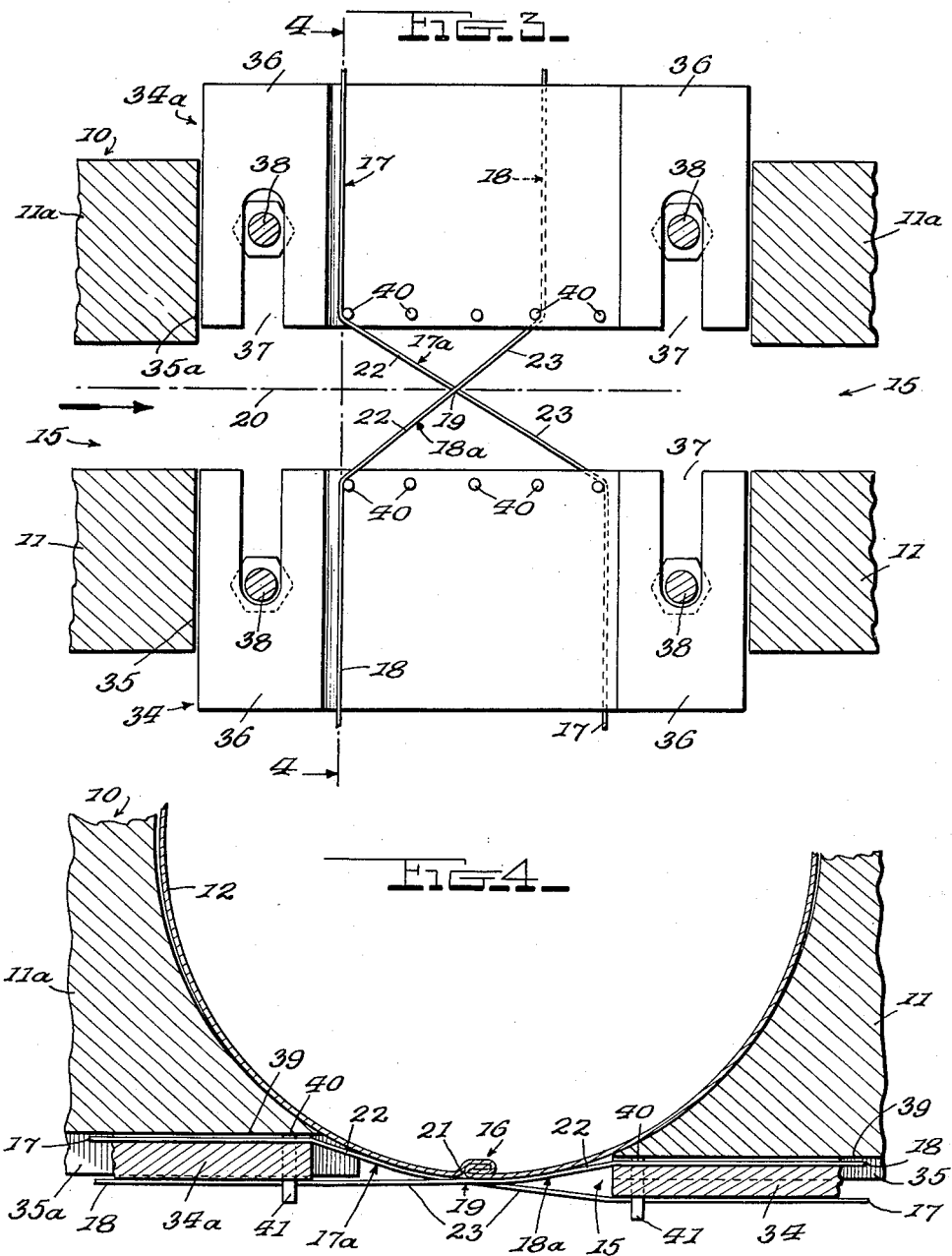

Dec. 30, 1958   G. M. FLYNN   2,866,430
CAN BODY SIDE SEAM WIPING MEANS
Filed Nov. 25, 1955   3 Sheets-Sheet 3
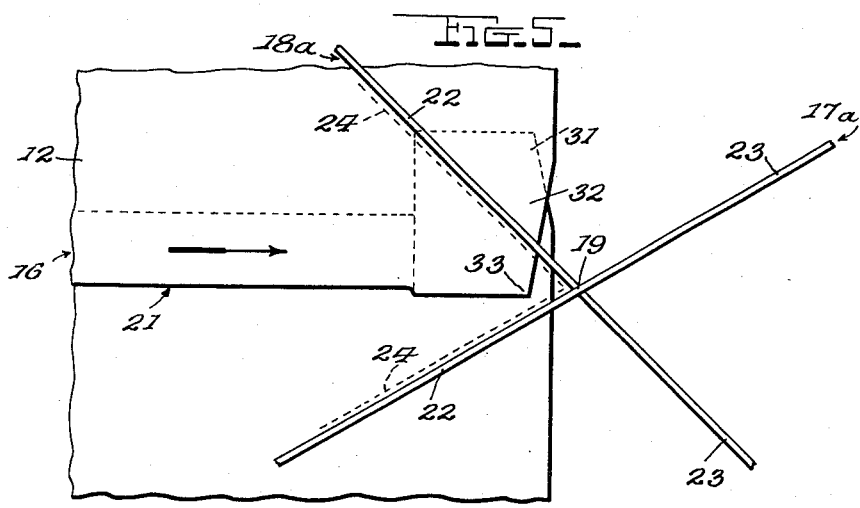
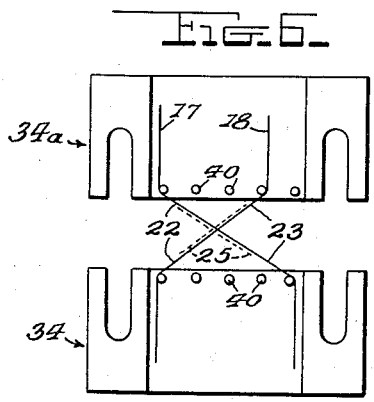
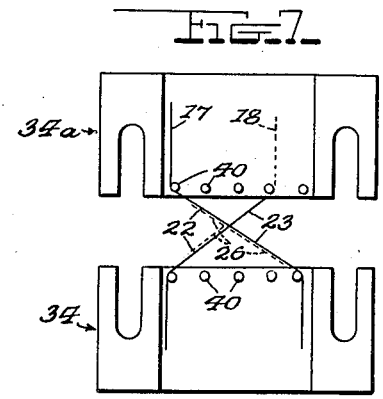
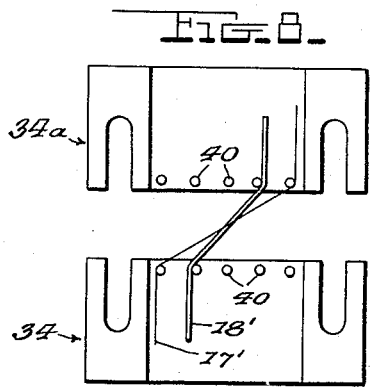
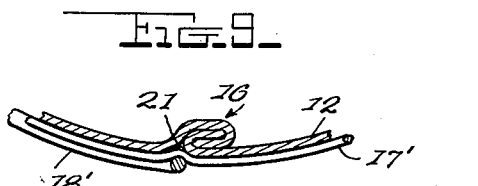
INVENTOR
G. M. Flynn
BY
Mason, Porter, Diller & Stewart
ATTORNEYS United States Patent Office 2,866,430
Patented Dec. 30, 1958

2,866,430

CAN BODY SIDE SEAM WIPING MEANS

George M. Flynn, Oak Park, Ill., assignor to Continental Can Company, Inc., New York, N. Y., a corporation of New York Application November 25, 1955, Serial No. 548,932

4 Claims. (Cl. 113—97)

Like my companion U. S. application, Serial No. 548,513, executed Nov. 16, 1955, the present invention relates to wire-type wiping means for wiping excess solder from the side seam zones of metal can bodies as they are advanced along the soldering horn of a side seam soldering machine; and any novelty common to both applications is claimed in said companion application.

One object of the invention is to provide a wiping means having two crossed wiping wires associated in a novel manner with a soldering horn of the type having two longitudinally channeled side members spaced apart at their lower edges to provide a relatively long and narrow slot in which the fresh solder spread or stripe, applied by the usual solder roll, is exposed.

Another object is to provide a crossed wire wiping means having the point at which the wires cross so located as to follow the usual side seam opening of each advancing can body and to so arrange the two crossed wires that the portions of the latter which diverge toward the advancing cans will wipe the solder toward said side seam opening.

A further object is to so position the crossed wires that the exposed corner of the outer lap portion of the conventional lock and lap seam cannot catch thereon as any can body engages said wires.

A still further object is to provide a novel arrangement which pushes the solder down-hill along the wiping portions of the wires as the solder is being wiped off, thus avoiding complications which would arise from attempting to push the solder up-hill.

The two crossed wiping wires have two front portions which diverge from the crossing point toward the advancing can bodies, and two rear portions which diverge from said crossing point toward the delivery end of the horn, and further objects of the invention are, one, to provide one arrangement in which said front portions are utilized to V-wipe the seam zone; two, to provide a second arrangement in which both front portions and both rear portions are utilized to X-wipe; and three, to provide a third arrangement in which both front portions and one rear portion are employed to Y-wipe.

Another object is to provide a novel wire type wiping means in which provision is made for longitudinally feeding each wiping wire to present a constantly changing portion thereof for use, thereby preventing wear and danger of wire breakage.

Yet another object is to provide novel means for mounting the wiping wires on the side members of the soldering horn.

A still further object is to provide a novel construction in which one of two crossed wiping wires is of larger diameter than the other and acts to kink the latter slightly into each can body side seam opening to remove excess solder from this opening.

With the above and other objects in view that will hereinafter appear, the nature of the invention will be more clearly understood by reference to the following detailed description, the appended claims and the several views illustrated in the accompanying drawings.

In the drawings:

Figure 1 of the accompanying drawings is a fragmentary side elevation partly in section, showing a portion of a soldering horn and associated elements and illustrating one of the mounting plates for the wiping wires.

Figure 2 is a vertical transverse section on line 2—2 of Figure 1, showing the crossed wiping wires in readiness for engagement by a can body.

Figure 3 is an enlarged horizontal sectional view on line 3—3 of Figure 1, the wiping wires being positioned to V-wipe the can body seam zones.

Figure 4 is a further enlarged fragmentary transverse section on line 4—4 of Figure 3 showing a can body engaged with the wiping wires.

Figure 5 is an inverted view illustrating a portion of a can body and portions of the wiping wires, and showing that the exposed corner of the outer lap portion of the body side seam cannot catch on said corner.

Figure 6 is a plan view of the wire mounting plates and the crossed wiping wires, the latter being positioned for X-wiping.

Figure 7 is a similar view with the wires positioned for Y-wiping.

Figure 8 is a similar view showing a form of construction in which one of the crossed wires is of greater diameter than other and acts as a back up wire therefor.

Figure 9 is an enlarged fragmentary sectional view showing the manner in which the back up wire of Figure 8 kinks the other wire somewhat into the side seam opening of the can body.

A portion of a soldering horn 10 is shown, said horn having two longitudinally channeled side members 11, 11a between which the can bodies 12 are progressively advanced by feed dogs 13 of a drag chain 14, as usual. The lower edges of the side members 11, 11a are spaced apart to provide a relatively long and narrow slot 15 in which the seam zones of the advancing can bodies are downwardly exposed. During the travel of the can bodies, a conventional solder roll (not shown) applies molten solder to the seam zones of said bodies and an adequate amount of the solder finds its way into the side seams 16. Excess solder is then wiped off by crossed portions of two wiping wires as hereinafter explained. In most views, the two wires are identified by the reference numbers 17 and 18, respectively. In Figures 8 and 9, however, a modification is shown in which the wires are identified at 17' and 18', respectively.

The wires 17 and 18 have crossed portions 17a and 18a which obliquely span the slot 15 for wiping engagement with the seam zones of the can bodies 12. The crossing point 19 of these wire portions 17a and 18a is preferably on the line 20 (Figure 3) along which the side openings 21 of the seams 16 travel. In the present disclosure, this line 20 is closer to one longitudinal edge of the slot 15 than to the other longitudinal edge thereof, but the location of this line varies in different machines. It is therefore advisable to make provision whereby the location of the crossing point 19 may be varied accordingly, and with the mounting means hereinafter described, this is possible.

The portions 22 of the crossed wires which diverge toward the oncoming can bodies, preferably have their front ends disposed higher than the rear ends of the rearwardly diverging portions 23, as shown in Figures 2, 3 and 4. This causes the crossed wires to wipe the solder down-hill and hastens dropping of the wiped off solder from the wires. The principal wiping is done by the forwardly diverging wire portions 22 and a V-wipe is thus produced, as indicated by the dotted lines 24 in Figure 5. However, by locating the remote ends of both wire portions 22 and 23 in the same plane (Figure 6) an X-wipe will be produced as indicated by the dotted lines 25. Also, by modifying this latter arrangement by disposing the rear end of one of the wire portions 23 at a lower point (Figure 7) a Y-wipe will be produced as indicated by the dotted lines 26.

It is preferable to provide means for slowly feeding each wire 17, 18 longitudinally while keeping it under proper tension, thereby avoiding wire wear and breakage. In Figure 2, an arrangement for this purpose has been shown associated with the wire 17. A wire supply roll 27 is mounted at one side of the horn 10. At the other side of this horn, driven feed rolls 28 and a driven take-up reel 29 are provided. A friction brake 30 is indicated for the supply roll 27. As the feed and take-up rolls are slowly driven, the wire is slowly fed longitudinally, and the brake 30 sufficiently resists the pull on the wire to keep the latter under adequate tension.

When no can body is passing over the crossed wires, the crossed portions 17a and 18a thereof are taut as seen in Figure 2. As a can body 12 engages these crossed portions however, it cams them downwardly to wiping position as seen in Figure 4, they then wipe excess solder from the seam zone of the body and the wiped off solder falls immediately from the wires.

In Figure 5, a portion of a can body 12 is shown moving over the crossed portions 17a, 18a of the wires 17 and 18. The conventional side seam 16 includes inner and outer lap portions 31 and 32, and the latter has the usual exposed corner 33. The obliquity of the wire portion 18a is in such a direction that the corner 33 cannot catch on this wire portion as the can body cams the latter downwardly to wiping position. Moreover, this portion 18a lies upon the portion 17a, will depress the latter and prevent catching thereof on the corner 33 thereon.

In arrangements so far explained, both wires are of the same diameter, preferably about .008". In Figures 8 and 9, however, while the upper wire 17' may be of this same diameter, the lower wire 18' is of greater diameter and acts as a back-upwire for said wire 17'. The difference in wire diameter is of course exaggerated in the drawings. The wire 18 will kink the smaller wire 17' slightly into the side seam opening 21 as shown at 34 in Figure 9, thereby wiping excess solder from said opening 21.

While the wiping wires above described may be mounted in any of various ways, two mounting plates 34 and 34a have been shown secured to the side members 11 and 11a, respectively, of the horn 10. These plates are of flat rectangular form and they are secured in recesses 35 and 35a formed in the lower edges of the horn side members 11 and 11a, respectively. The recess 35 opens downwardly through the lower edge of the side member 11 and extends transversely from the outer side of this side member 11 to one longitudinal edge of the slot 15. The recess 35a is related in this same manner with the side member 11a.

Both plates 35, 35a have upwardly thickened end portions 36 formed with slots 37 through which cap screws 38 extend, these screws being threaded into the horn side members 11, 11a. The screws 38 clamp the upper sides of the thickened plate end portions 36 against the ceilings 39 of the recesses 35, 35a and the major portions of the plates 34, 34a are thus spaced downwardly from said ceilings 39 in order to permit passage of portions of the wiping wires between said plates and ceilings.

Along its inner edge, each plate 34, 34a is provided with spaced upstanding wire engaging studs 40 the upper ends of which abut the overlying ceiling 39. Each plate 34, 34a is also provided along its inner edge with spaced downwardly projecting wire-engaging studs 41.

In Figures 2, 3 and 4, the wire 17 extends inwardly over the plate 34a to one of the upper studs 40 of said plate, then extends obliquely across the slot 15 to one of the lower studs 41 of the plate 34 and then extends outwardly across the lower side of the latter. In these views, the wire 18 extends inwardly under the plate 34 to one of the lower studs 41 of this plate, then extends obliquely across the slot 15 to one of the upper studs 40 of the plate 34 and then extends outwardly across the upper side of this plate 34. Thus, the front ends of the diverging wire portions 22 are mounted higher than the rear ends of the diverging portions 23 as above explained.

In Figures 6 to 8, the manner in which the wires are engaged with the studs and plates will be clear without further explanation.

When the line 20 (Figure 3) along which the side seam opening 21 travels, is closer to one side member of the horn than to the other side member, it is advisable to mount the plate underlying said one member above the plane of the other plate, in order that the curved portions of the wiping wires may wipe equidistantly at opposite sides of said side seam opening. Then, in order to give proper declination to the wire portion 23 which extends to the higher plate, this plate should be thicker than the other plate. Such conditions are shown in Figure 4, in which the plate 34a under the horn side member 11a is mounted higher than the plate 34 and is thicker than said plate 34.

The plates 34, 34a and their studs 40, 41 provide effective means for mounting the wiping wires and for changing the angular relation of the crossed portions of said wires to locate the crossing point at the desired position. These plates and studs also allow easy positioning of the wires for a V-wipe (Figures 3 and 5), and an X-wipe (Figure 6), or a Y-wipe (Figure 7).

From the foregoing it will be seen that novel and advantageous provision has been disclosed for attaining the desired ends.

While example disclosures of the wiper wire arrangements are made herein it is to be understood that variations in the disclosed arrangements may be made within the spirit and scope of the invention as defined in the appended claims.

I claim:

1. In a can body side seam soldering machine, a soldering horn along which the can bodies are progressively advanced with their freshly soldered side seams presented downwardly, a transverse wiping wire directly under the path of the can bodies and positioned to wipe excess solder from the seam zones of the advancing cans, means at one side of said horn for slowly pulling the wire longitudinally, and means at the other side of said horn for sufficiently resisting the pull upon the wire as to cause tensioning of the latter to wiping condition.

2. In a can body side seam soldering machine, a horn provided with two opposed longitudinally channeled side members between which freshly soldered can bodies are progressively advanced, the lower edges of said side members being spaced apart to provide a relatively long and narrow slot in which the seam zones of the can bodies travel, said side members each having a shallow recess which opens downwardly through its lower edge and also opens through its inner and outer sides, two horizontal plates secured in the two recesses respectively, said plates having upper side portions spaced slightly downward from the ceilings of said recesses, and wire engaging studs disposed at the inner edges of said plates, some of said studs being at said upper side portions of said plates and the remainder at the lower sides of said plates, and two wiping wires having crossed portions obliquely spanning the aforesaid slot, the front ends of said crossed portions being disposed over said plates and engaged with two upper studs, the rear ends of said crossed portions being disposed under said plates and engaged with two lower studs respectively.

3. In a can body side seam soldering machine, a horn provided with two opposed longitudinally channeled side members between which freshly soldered can bodies are progressively advanced, the lower edges of said side members being spaced apart to provide a relatively long and narrow slot in which the seam zones of the can bodies travel, said side members each having a shallow recess which opens downwardly through its lower edge and also opens through its inner and outer sides, two horizontal plates secured in the two recesses respectively, said plates having upper side portions spaced slightly downward from the ceilings of said recesses, two wiping wires having crossed portions spanning the aforesaid slot, both the front and the rear ends of said crossed portions being disposed over said upper side portions of said plates, and studs on said upper sides of said plates with which said wires are engaged.

4. In a can body side seam soldering machine, a horn provided with two opposed longitudinally channeled side members between which freshly soldered can bodies are progressively advanced, the lower edges of said side members being spaced apart to provide a relatively long and narrow slot in which the seam zones of the can bodies travel, said side members each having a shallow recess which opens downwardly through its lower edge and also opens through its inner and outer sides, two horizontal plates secured in the two recesses respectively, said plates having upper side portions spaced slightly downward from the ceilings of said recesses, two wiping wires having crossed portions spanning the aforesaid slot, the front ends of both of said crossed portions being disposed over said upper side portions of said plates, the rear end of one of said crossed portions being disposed over said upper side portion of one of said plates, the rear end of the other of said crossed portions being disposed under the other of said plates, and studs on said plates with which said wires are engaged.

References Cited in the file of this patent

UNITED STATES PATENTS

| | | |
|---|---|---|
| 2,432,788 | O'Brien, Jr. et al. | Dec. 16, 1947 |
| 2,553,547 | Brown et al. | May 22, 1951 |